(No Model.)
H. RENSCH.
FIRE ESCAPE.
No. 318,293. Patented May 19, 1885.
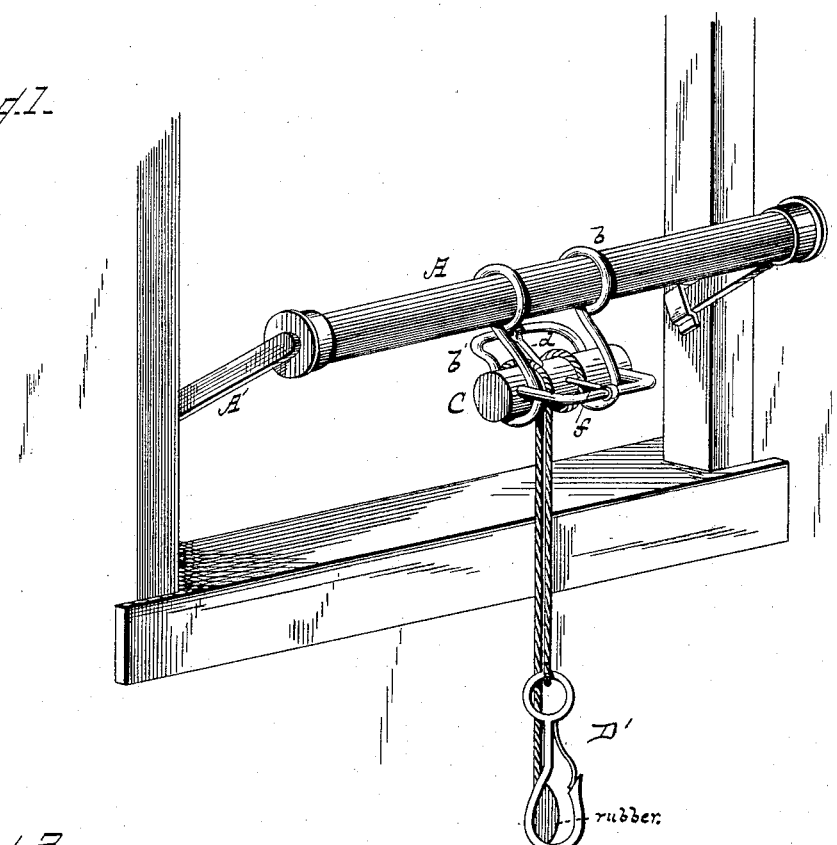
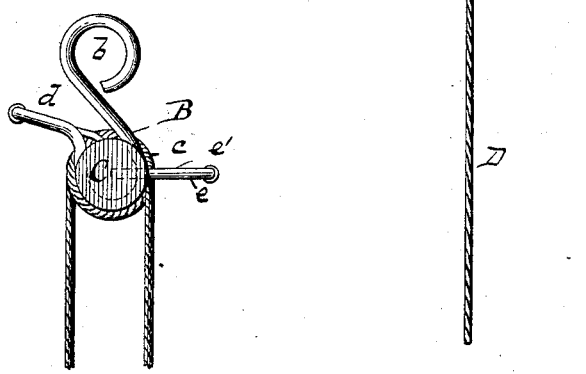
WITNESSES
F. L. Ourand
E. W. Johnson
Henry Rensch
INVENTOR
Attorney

UNITED STATES PATENT OFFICE.

HENRY RENSCH, OF QUINCY, ILLINOIS.

FIRE-ESCAPE.

SPECIFICATION forming part of Letters Patent No. 318,293, dated May 19, 1885.

Application filed April 2, 1885. (No model.)

*To all whom it may concern:*

Be it known that I, HENRY RENSCH, a citizen of the United States of America, residing at Quincy, in the county of Adams and State of Illinois, have invented certain new and useful Improvements in Fire-Escapes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in fire-escapes; and it consists, more especially, in a friction device which is adapted to be applied to a projecting cross-bar which extends outwardly from the window-casing; and my invention consists in a supplemental bar which is provided with eyes for attachment to the projecting bar, and guides for the rope, as will be hereinafter fully set forth, and specifically pointed out in the claims.

In the accompanying drawings, which illustrate my invention, Figure 1 is a perspective view, and Fig. 2 is a sectional view.

A represents the bar which projects from the window, the ends of which are attached to arms A', which are adapted to be inserted in sockets secured on the sides of the window-frame and be removed from said sockets, so that the same may be folded within the casing. The bar A is embraced or encircled by the ends of a metal rod, B, which ends are bent so as to form loops $b\ b$. After forming the loops $b\ b$ the bar is bent downwardly and enters recesses $c\ c$, formed in a short round rod, C, after which the same is bent so as to form a loop, $b'$, which projects rearwardly from the rod or bar C. The center portion of the loop $b'$ is provided with a tongue, $d$, one end of which encircles the center portion of the loop, while the opposite end enters the bar C, this arrangement preventing the bar turning in its supporting-rod. On the bar C, opposite the loop $b'$, is a bail, $e$, the ends $e'$ of said bail entering the bar C on each side of the bar B, the ends of this bail preventing the bar B from being displaced laterally from the bar C. A tongue, $f$, encircles the outer portion of the bail at about its center and enters the bar C. A rope, D, is wrapped spirally around the bar C, so that its ends will lie on opposite sides of the same; and between said coils are located the tongues $d\ f$, which will keep the rope equally disposed about the bar and on opposite sides of its center, and between the ends of the bail and loop. The ends of the rope D are each provided with snap-hooks D'. The rope D is of sufficient length to reach from the window to the ground and allow the operator or person attached to one of the hooks to grasp the opposite rope and regulate its descent thereby.

When a person desires to descend from the window by means of my improved fire-escape, he is provided with a suitable harness, with a ring for engagement with the hook D', and when he leaves the window his weight falls upon one of the hooks, and his descent can be regulated by either grasping the rope and tightening the same, so as to create a greater frictional contact of said rope with the bars; or the rope may be paid out by a person stationed on the ground.

I claim—

1. In a fire-escape, a round bar, C, provided with a supporting-bar, B, having looped ends, the central portion of the bar B forming a bail or loop, in combination with a rope which is twisted around the bar C within the loop, substantially as shown, and for the purpose set forth.

2. In combination with a main supporting bar or rod, a round supplemental bar attached beneath the same by means of a bar bent as shown, and a rope coiled upon said bar and provided with attaching-hooks D', substantially as shown, and for the purpose set forth.

3. In a fire-escape, the supporting-bar A, in combination with the bar C, suspended therefrom, a bar, B, suspending said bar C, said bar being bent so as to form a loop, and bail $e$, having its end members inserted in the bar C, adjacent to the sides of the supporting-bar B, the parts being organized substantially as shown, and for the purpose set forth.

In testimony whereof I affix my signature in presence of two witnesses.

HENRY RENSCH.

Witnesses:
A. M. SWARTWOUT,
EDWARD ORSCHEL.